United States Patent [19]
Saliba et al.

[11] Patent Number: 5,724,723
[45] Date of Patent: Mar. 10, 1998

[54] APPARATUS FOR ASSEMBLING AN OPTICAL FIBER CONNECTOR

[75] Inventors: Kenneth Norman Saliba, Tewksbury, Mass.; Joseph Leon Kaminski, III; Richard Eugene Benner, both of Harrisburg, Pa.

[73] Assignee: The Whitaker Corporation, Wilmington, Del.

[21] Appl. No.: 652,077

[22] Filed: May 23, 1996

Related U.S. Application Data

[62] Division of Ser. No. 350,446, Dec. 6, 1994, Pat. No. 5,625,731.

[51] Int. Cl.$^6$ .................... H01R 43/26; B23P 19/04; G02B 6/36

[52] U.S. Cl. .............. 29/754; 29/33 M; 29/229; 29/705; 29/743; 29/760; 29/785; 29/792; 269/21; 294/64.1; 385/72; 385/76

[58] Field of Search .................. 29/33 M, 227, 29/229, 705, 712, 743, 745, 754, 760, 785, 792, 828, 467; 294/64.1; 269/21, 903; 414/737, 752; 385/53, 72, 76

[56] References Cited

U.S. PATENT DOCUMENTS

| | | | |
|---|---|---|---|
| Re. 31,515 | 2/1984 | Heldt | 350/96.21 |
| 2,683,924 | 7/1954 | Schryver | 29/754 |
| 3,570,098 | 3/1971 | Bang | 29/754 |
| 3,698,062 | 10/1972 | La Valle | 29/745 X |
| 3,790,791 | 2/1974 | Anderson | 250/227 |
| 4,413,880 | 11/1983 | Forrest et al. | 350/96.2 |
| 4,418,983 | 12/1983 | Bowen et al. | 350/96.21 |
| 4,477,146 | 10/1984 | Bowen et al. | 350/96.21 |
| 4,553,814 | 11/1985 | Bahl et al. | 350/96.21 |
| 4,603,465 | 8/1986 | Bretti et al. | 29/564.6 |
| 4,699,456 | 10/1987 | Mackenzie | 350/96.2 |
| 4,699,462 | 10/1987 | Jones | 350/96.23 |
| 4,776,740 | 10/1988 | Holton | 411/521 |
| 4,790,622 | 12/1988 | Levinson et al. | 350/96.2 |
| 4,793,683 | 12/1988 | Cannon, Jr. et al. | 350/96.21 |
| 4,810,053 | 3/1989 | Woith | 350/96.2 |
| 4,812,006 | 3/1989 | Osborn et al. | 350/96.21 |
| 4,813,760 | 3/1989 | Tanaka et al. | 350/96.21 |
| 4,818,057 | 4/1989 | Bruch | 350/96.2 |
| 4,832,435 | 5/1989 | Suzuki et al. | 350/96.2 |
| 4,834,603 | 5/1989 | Holton | 411/521 |
| 4,836,637 | 6/1989 | Poorman et al. | 350/96.21 |
| 4,852,963 | 8/1989 | Lampert | 350/96.21 |
| 4,881,792 | 11/1989 | Alameel et al. | 350/96.2 |
| 4,930,856 | 6/1990 | Pelta | 350/96.2 |

(List continued on next page.)

FOREIGN PATENT DOCUMENTS

| | | | |
|---|---|---|---|
| 0 624 810 A2 | 11/1994 | European Pat. Off. | |
| 5314391 | 2/1978 | Japan | 29/828 |
| 6135139 | 7/1985 | Japan | 29/229 |
| 807684 | 1/1959 | United Kingdom | 29/229 |

*Primary Examiner*—Peter Vo
*Attorney, Agent, or Firm*—June B. Schuette

[57] ABSTRACT

An apparatus for assembling a multiple component article such as an optical fiber connector and inspecting assembled multiple component articles. The apparatus includes a fixture or nest for retaining an elongated body of the connector in a selected orientation. Stations of the apparatus are included for placing the elongated body in the fixture in a selected orientation, placing a biasing component on the elongated body, placing a coupling nut on the elongated body over the exposed end and abutting the biasing component, and applying a retaining component to an outside surface of the elongated body for retaining the biasing component between the elongated body and the coupling nut in a compressed state. The inspection system includes a fixture for retaining the multiple component article in a selected orientation in which a portion of the elongated body and a portion of the coupling nut are exposed for inspection. An emitter/detector is provided for identifying the presence of the elongated body and the coupling nut and indicating when the elongated body and coupling nut are properly assembled. Two emitter/detectors are positioned for acting on at least two sites relative to the multiple component article retained in the fixture.

11 Claims, 9 Drawing Sheets

U.S. PATENT DOCUMENTS

| | | | |
|---|---|---|---|
| 4,998,796 | 3/1991 | Bonanni et al. | 350/96.21 |
| 5,018,822 | 5/1991 | Freismuth et al. | 350/96.2 |
| 5,052,774 | 10/1991 | Bulman et al. | 385/86 |
| 5,058,985 | 10/1991 | Davenport et al. | 385/115 |
| 5,067,733 | 11/1991 | Nagal et al. | 277/11 |
| 5,073,044 | 12/1991 | Egner et al. | 385/86 |
| 5,121,455 | 6/1992 | Palecek | 385/69 |
| 5,142,598 | 8/1992 | Tabone | 385/78 |
| 5,142,600 | 8/1992 | Ortiz, Jr. | 385/83 |
| 5,142,601 | 8/1992 | Shibata et al. | 385/86 |
| 5,185,837 | 2/1993 | Ayuta et al. | 385/81 |
| 5,193,099 | 3/1993 | Chou | 372/107 |
| 5,208,887 | 5/1993 | Grinderslev | 385/81 |
| 5,222,176 | 6/1993 | Webber et al. | 385/99 |
| 5,241,611 | 8/1993 | Gould | 385/70 |
| 5,245,683 | 9/1993 | Belenkiy et al. | 385/72 |
| 5,253,315 | 10/1993 | Fentress | 385/78 |
| 5,257,333 | 10/1993 | Nodfelt | 385/64 |
| 5,271,080 | 12/1993 | Hopper et al. | 385/76 |
| 5,276,750 | 1/1994 | Manning | 385/56 |
| 5,276,752 | 1/1994 | Gugelmeyer et al. | 385/69 |
| 5,315,757 | 5/1994 | Koch et al. | 29/743 X |
| 5,432,996 | 7/1995 | Imgrut et al. | 29/792 X |
| 5,436,995 | 7/1995 | Yoshizawa et al. | 385/86 |

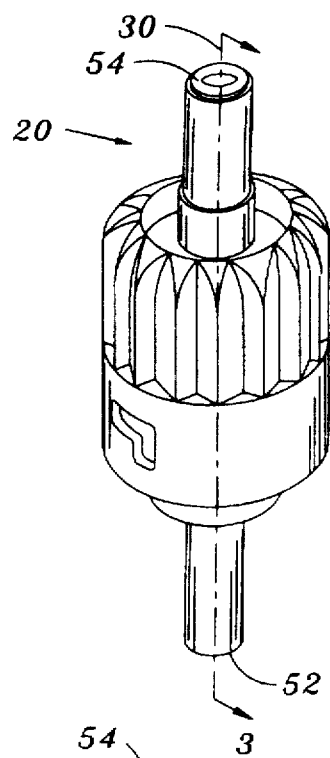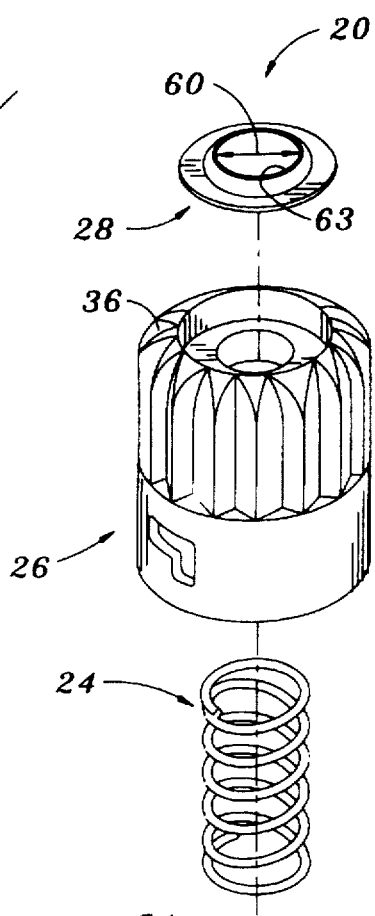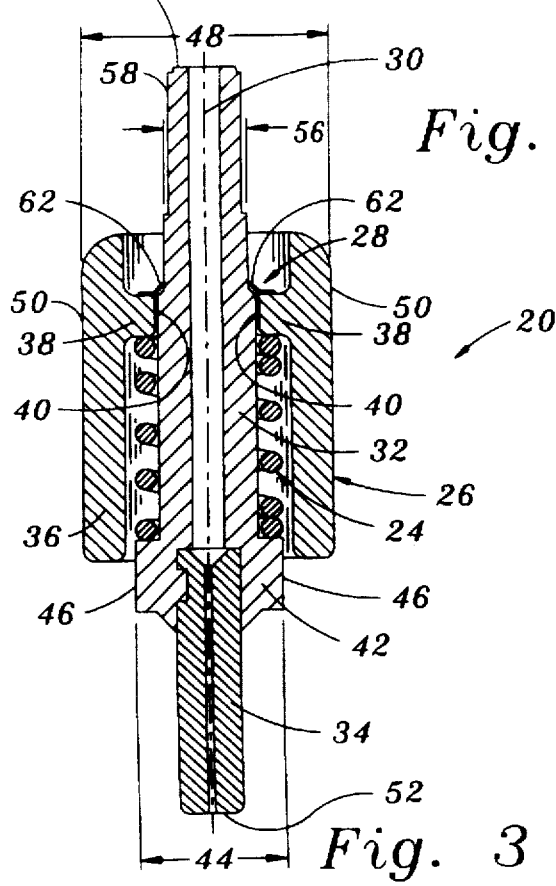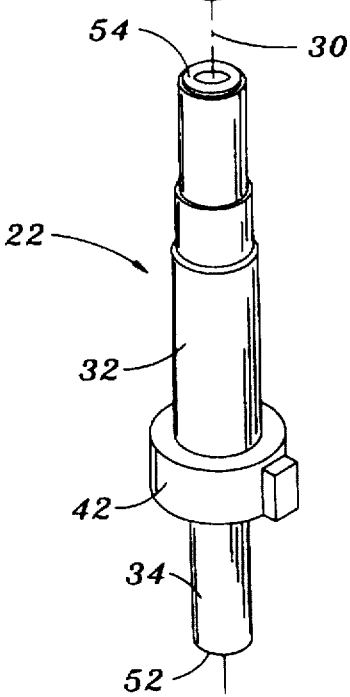
Fig. 1
Fig. 2
Fig. 3

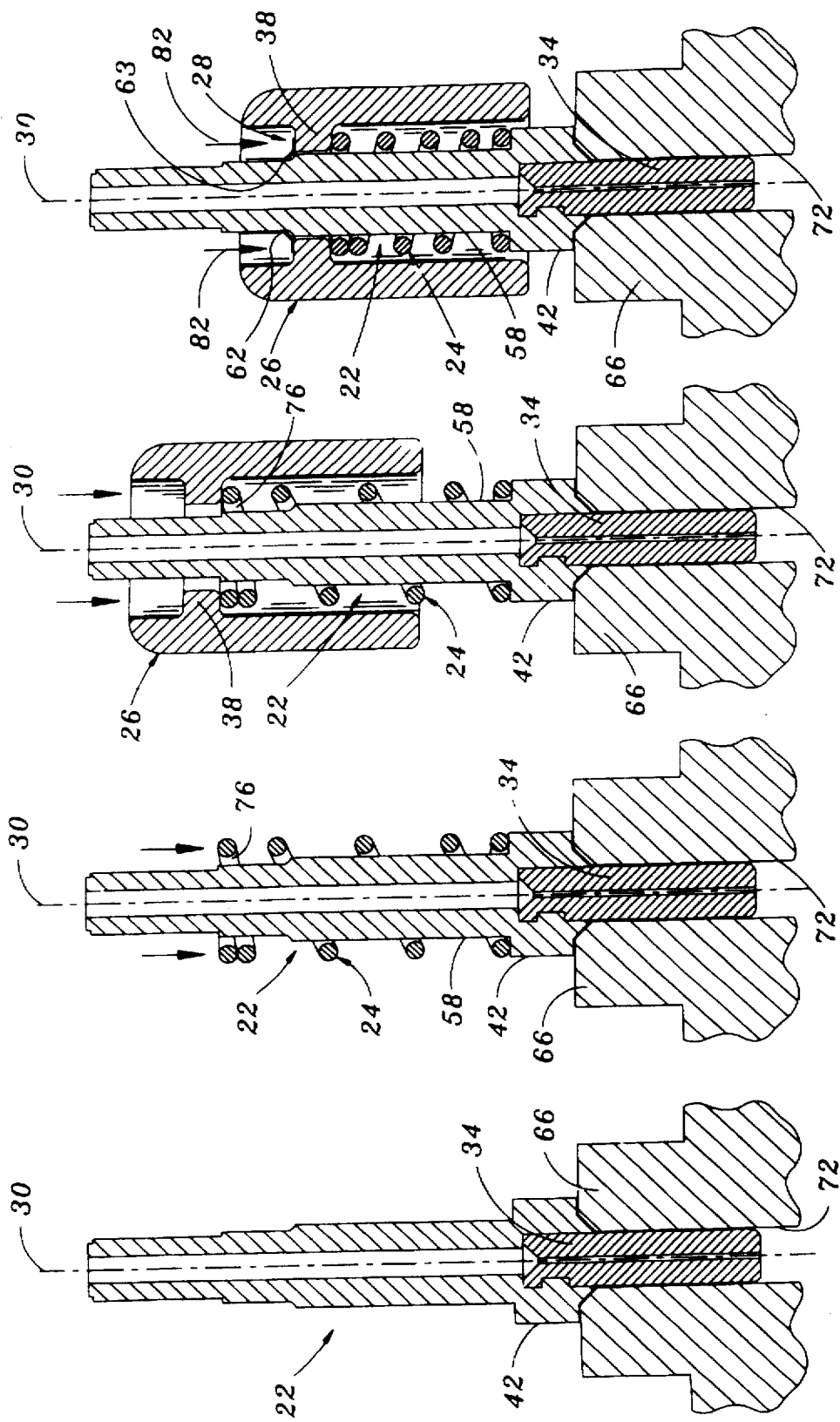

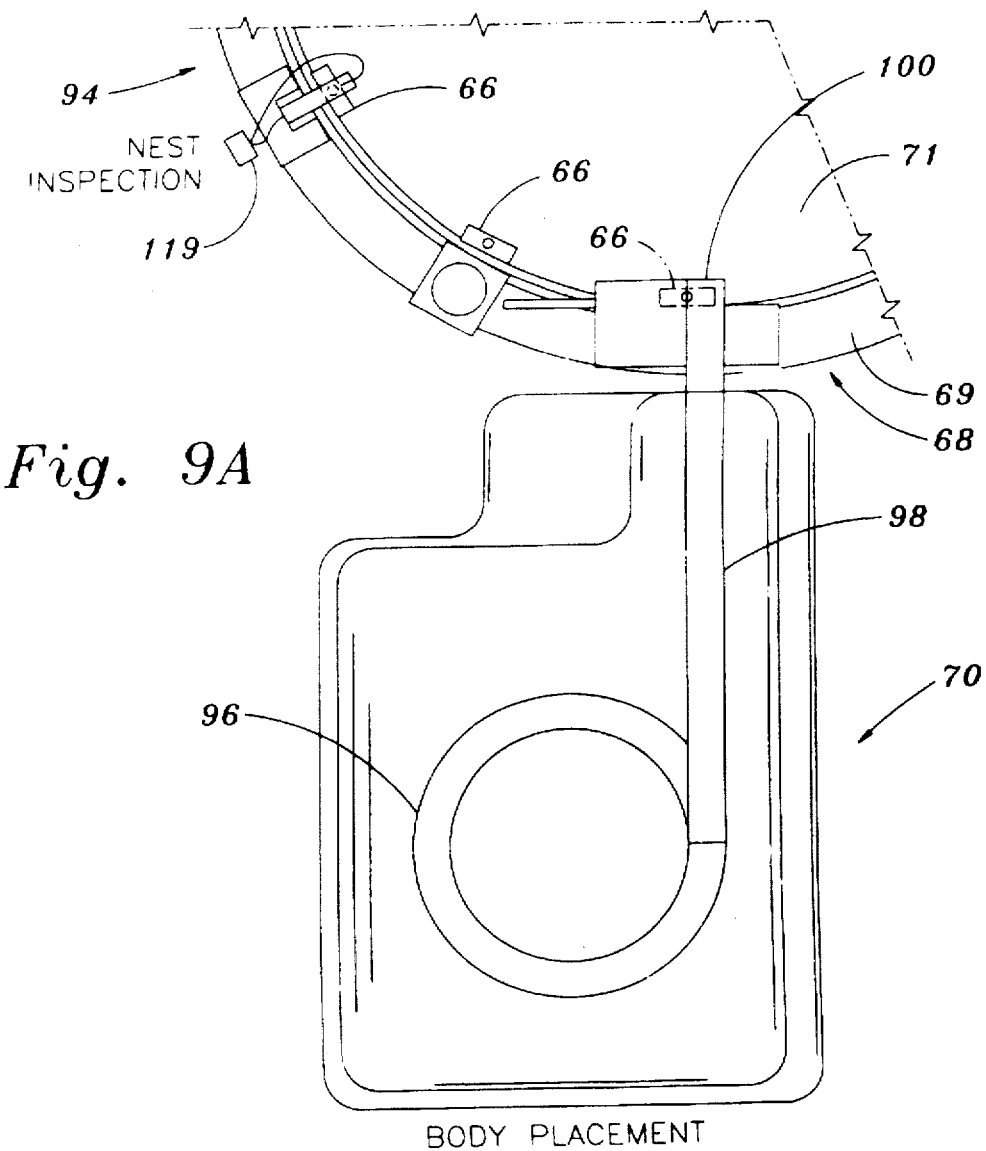

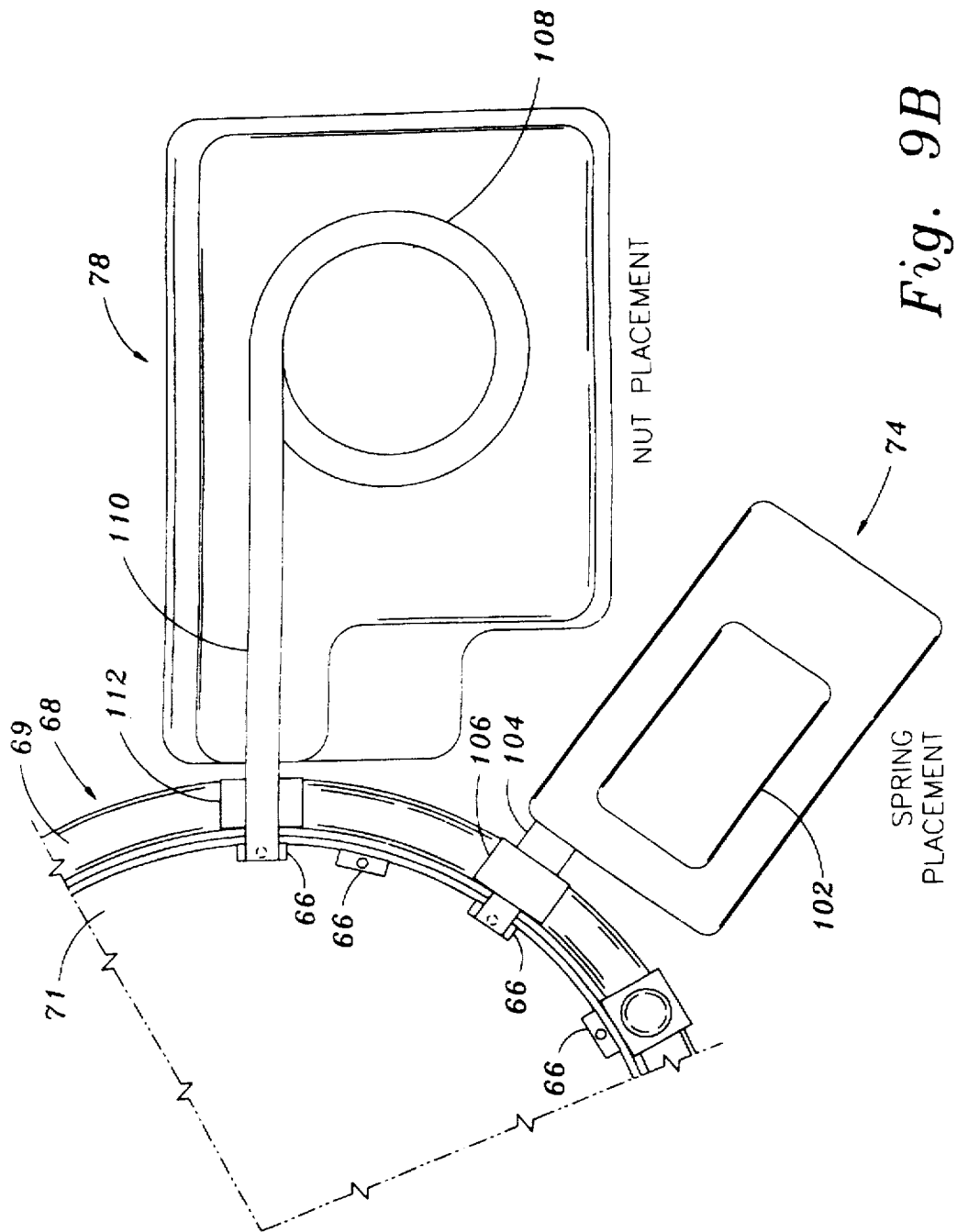

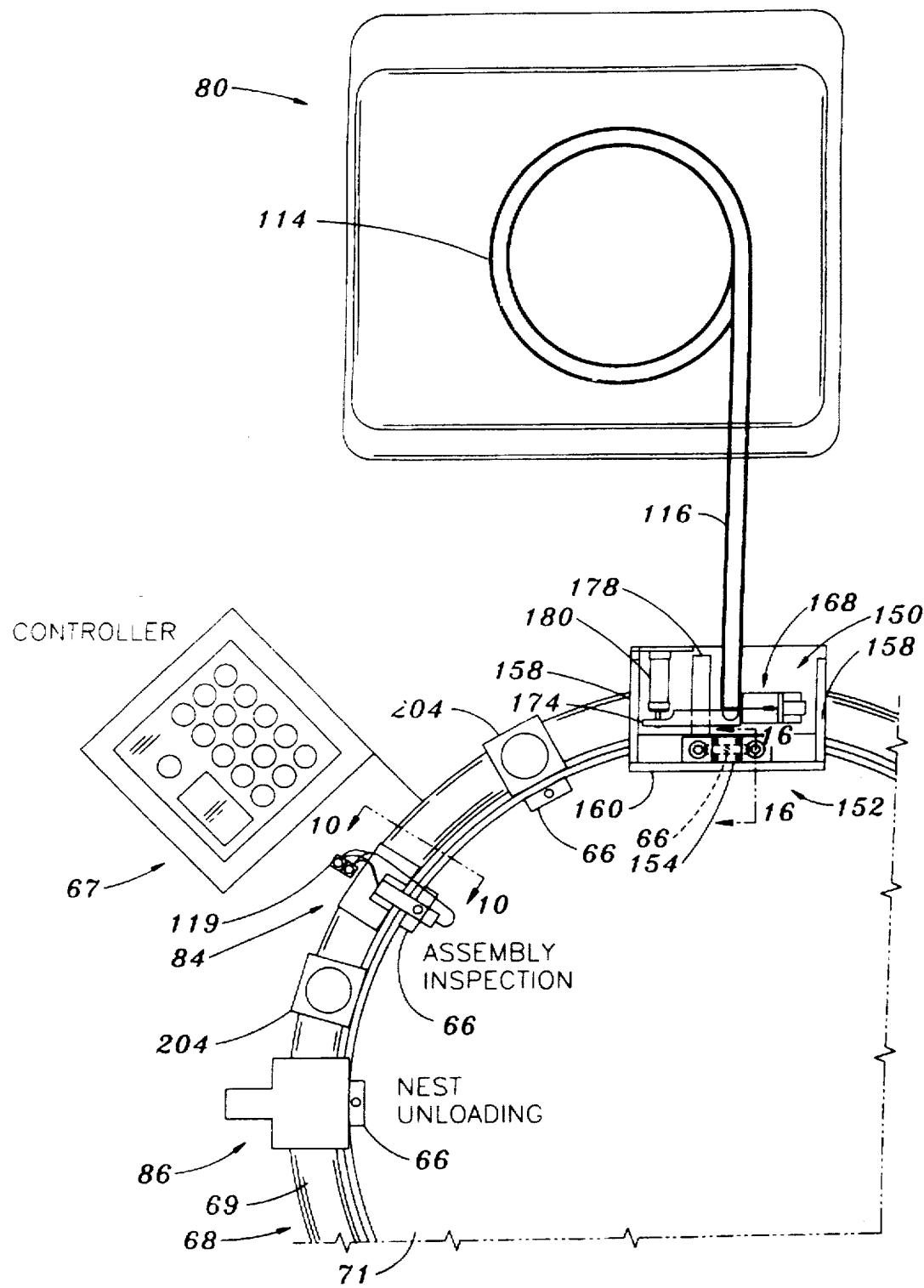

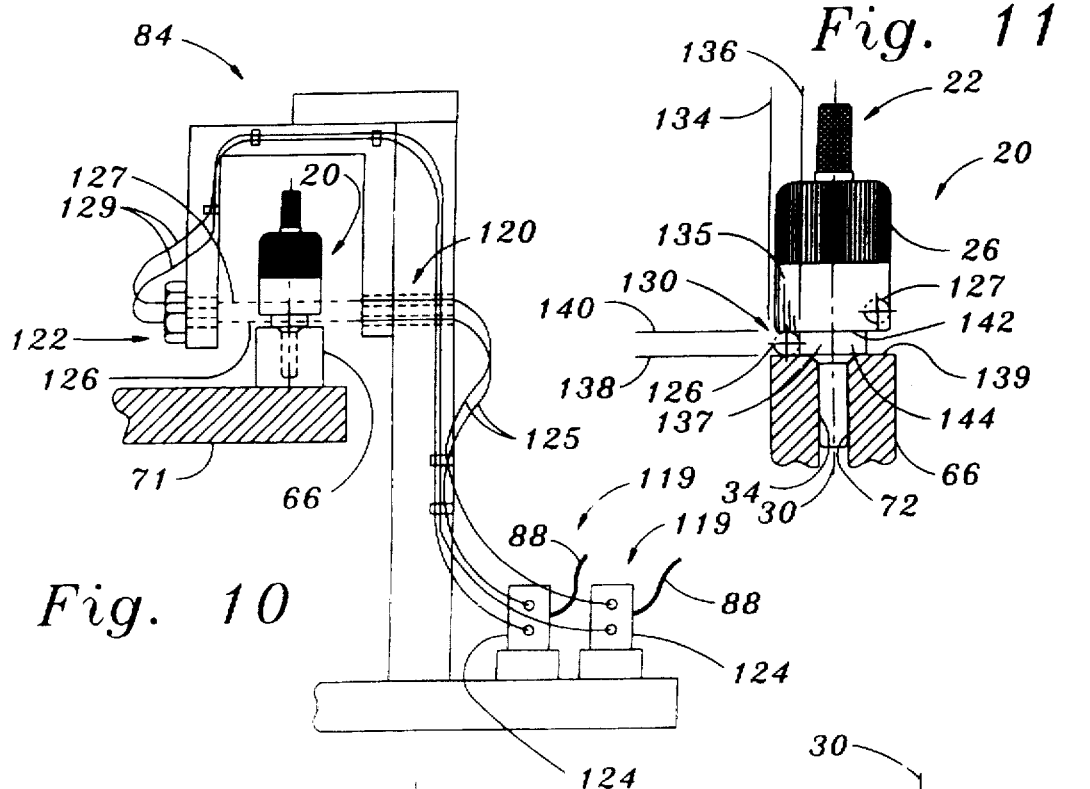
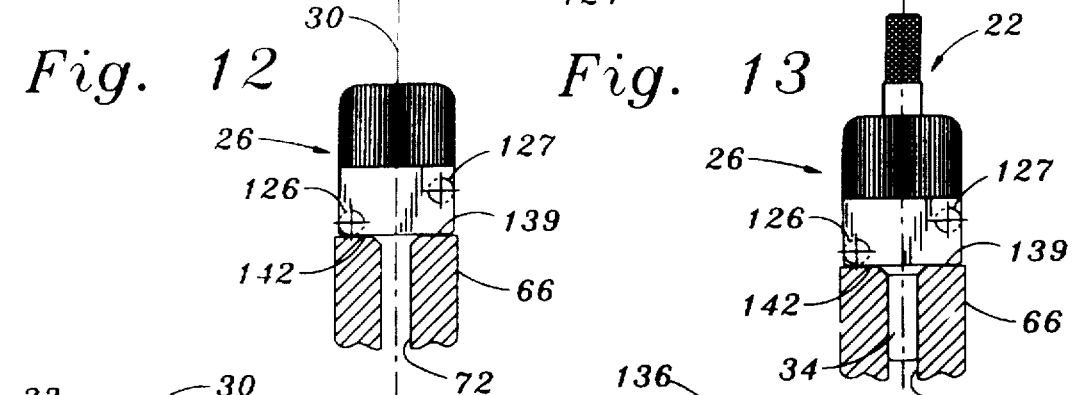
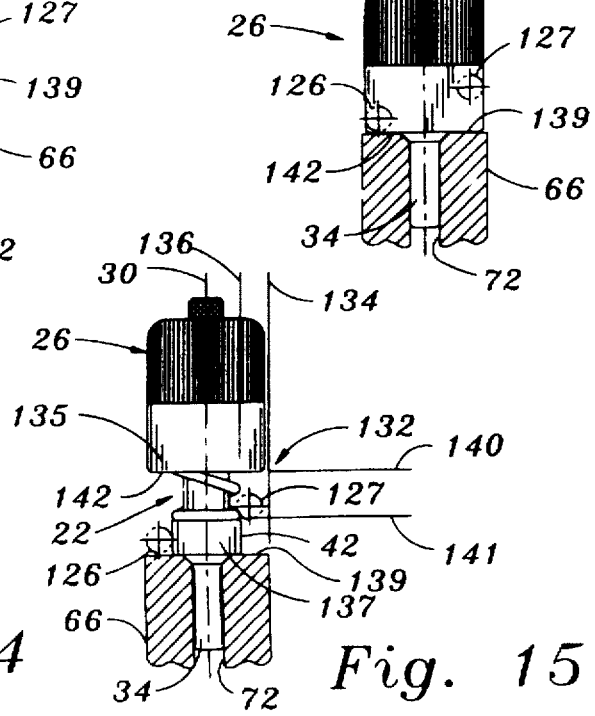
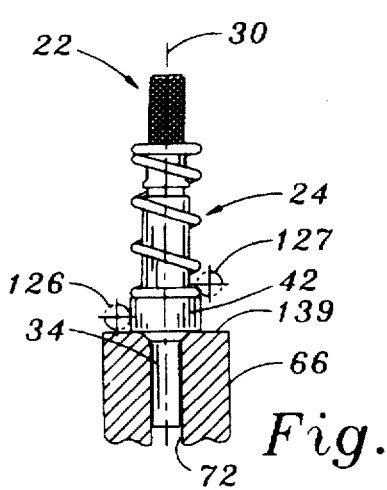

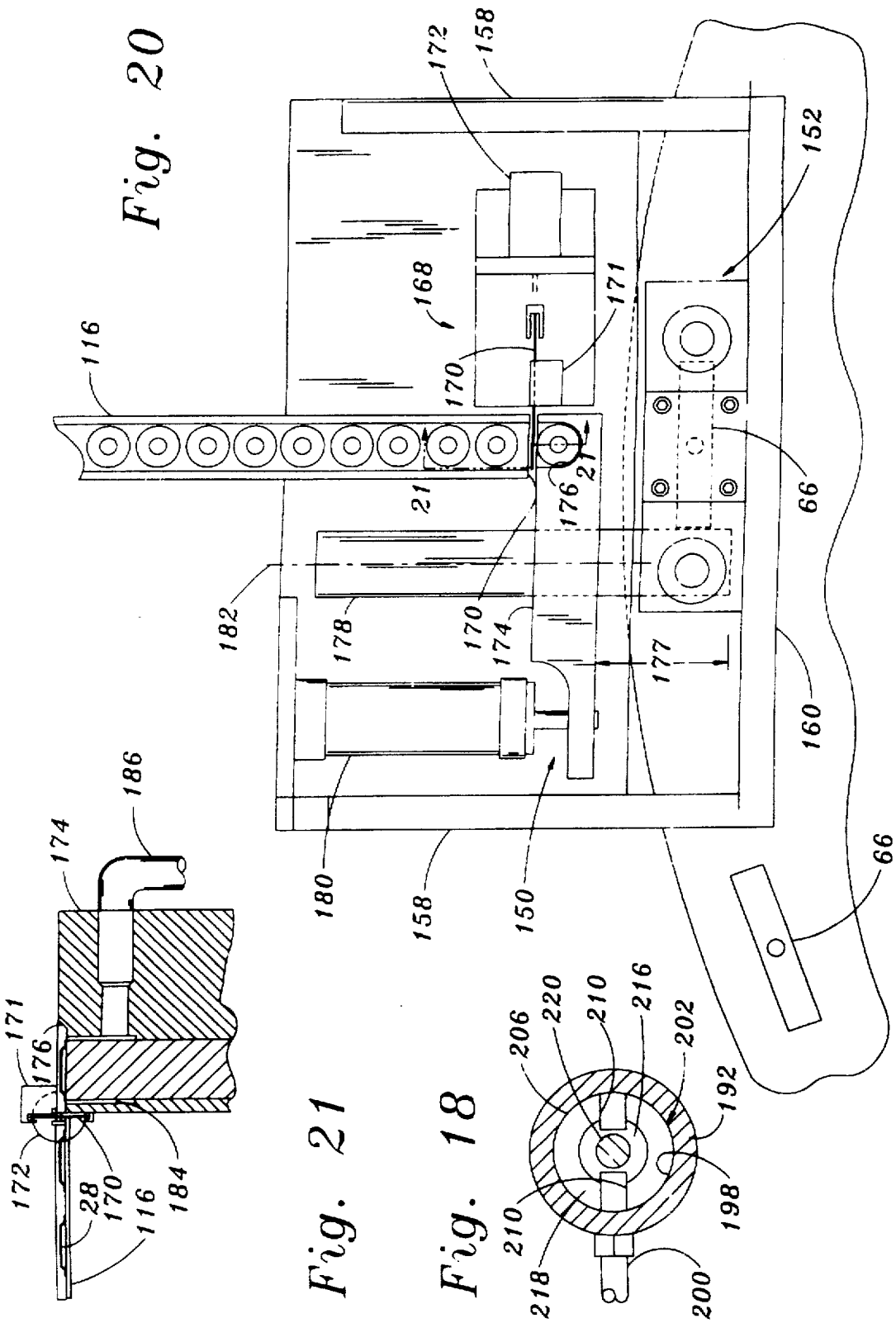

APPARATUS FOR ASSEMBLING AN OPTICAL FIBER CONNECTOR

This application is a divisional of application Ser. No. 08/350,446 filed Dec. 6, 1994 now U.S. Pat. No. 5,625,731.

BACKGROUND

The present invention relates to a process and apparatus for assembling a multiple component article such as a multiple component optical fiber connector and an inspection system for inspecting such multiple component articles.

Multiple component optical fiber connectors are extremely important to make critical mechanical connections between the free ends of optical fibers. More and more systems are using fiber optic technologies to increase computing power, data transmission volume and speed as well as numerous other applications. It is important that the connectors securely retain the connection between the two pieces of optical fiber. A variety of connectors have been developed to provide such connection. For example, U.S. Pat. No. 5,073,044 to Egner et al., issued Dec. 17, 1991, to the Assignee of the present invention, shows an optical fiber connector having a right angle strain relief.

The general design of the Egner device is typical for optical fiber connectors. Such a connector includes an elongated body, a coupling nut, biasing means and a retaining ring. The coupling nut and biasing means are axially arranged on the elongated body and retained in position by the retaining ring. The biasing means acts against the coupling nut to provide a secure engagement with the other coupling component with which it is connected.

Typically, the retaining rings are a C-ring having an open gap along one side for radial attachment to the elongated body. The C-ring is mated with an annular groove formed on an outside surface of the elongated body. Further, these C-rings are manually attached to the elongated body adding delay and cost to the connector assembly process. U.S. Pat. No. 5,121,455 to Palecek, issued Jun. 9, 1992, explicitly shows a C-ring used to retain a coupling nut and spring on the elongated body of an optical fiber connector.

As the demand for fiber optic technology increases so does the demand for connections between optical fibers. In order to satisfy the demand for optical fiber connectors, it is preferable to automate the assembly process for assembling optical fiber connectors. As with many other automated processes, problems arise with the efficient processing of numerous components during the assembly process as well as the most efficient organization and layout of the process apparatus. It is also important to automate the inspection process where possible so that the production throughput is maintained and bottlenecks, which might be caused by manual inspection, are eliminated.

OBJECTS AND SUMMARY

A general object satisfied by the present invention is to provide a method of assembling multiple component articles which require precise placement of components in an assembly stream and operations on the components during the assembly process.

Another object satisfied by the present invention is to provide an apparatus which automates the assembly of optical fiber connectors in a continuous process.

Yet another object satisfied by the present invention is to provide an inspection system for multiple component articles which is capable of determining whether each multiple component article is properly or improperly assembled.

Briefly, and in accordance with the foregoing, the present invention envisions a method for assembling a multiple component article such as an optical fiber connector. The method includes the steps of positioning an elongated body with one free end being exposed, positioning a biasing component over the exposed end, positioning a coupling nut over the exposed end and abutting the biasing component, and applying a retaining component to the elongated body to retain the biasing component in a compressed state between the elongated body and the coupling nut.

The present invention also envisions an apparatus for assembling an optical fiber connector. The apparatus includes a fixture or nest for retaining an elongated body of the connector in a selected orientation. Stations of the apparatus are included for placing the elongated body in the fixture in a selected orientation, placing a biasing component on the elongated body, placing a coupling nut on the elongated body over the exposed end and abutting the biasing component, and applying a retaining component to an outside surface of the elongated body for retaining the biasing component between the elongated body and the coupling nut in a compressed state.

The invention further envisions an inspection system for inspecting multiple component articles such as optical fiber connectors. The inspection system includes a fixture for retaining an optical fiber connector in a selected orientation in which a portion of the elongated body and a portion of the coupling nut are exposed for inspection. An emitter/detector is provided for identifying the presence of the elongated body and the coupling nut and indicating when the elongated body and coupling nut are properly assembled. The emitter detector is positioned for acting on at least two sites relative to the multiple component article retained in the fixture.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a perspective view of a multiple component article in the form of an optical fiber connector as assembled and inspected by the process and apparatus of the present invention;

FIG. 2 is an exploded perspective view of the multiple component article as shown in FIG. 1 which has been exploded to show the individual components of the optical fiber connector;

FIG. 3 is a cross-sectional side elevational view taken along line 3—3 in FIG. 1 of the optical fiber connector in an assembled state;

FIG. 5 is a cross-sectional side elevational view of the first of a series of progressive views showing the process of the present invention in which an elongated body is retained in a fixture of the apparatus of the present invention;

FIG. 6 is a cross-sectional side elevational view of the second of the series of progressive views in which a biasing component is added to the elongated body during the process carried out by the apparatus of the present invention;

FIG. 7 is a cross-sectional side elevational view of the third of the series of progressive views showing the addition of a coupling nut to the elongated body and biasing component during the process carried out by the apparatus of the present invention;

FIG. 8 is a cross-sectional side elevational view of the fourth of the series of progressive views showing the application of a retaining component to an outside surface of the elongated body in the process carried out by the apparatus of the present invention;

FIG. 9 is a reduced scale view showing the arrangement of FIGS. 9A, 9B, 9C which are enlarged detailed views of the apparatus of the present invention which, even though on separate sheets, actually comprise one figure;

FIG. 9A shows a station for verifying that a fixture or nest used in the apparatus is free to receive an elongated body and an enlarged plan view of a station which places an elongated body of the multiple component article on the nest which is indexed through the apparatus;

FIG. 9B shows a station which places a biasing component on the elongated body retained in the fixture and a station which places a coupling nut over the biasing component and the elongated body;

FIG. 9C shows a station which places a retaining component on the elongated body carrying the biasing component and the coupling nut, a control device for controlling the apparatus, an inspection station for inspecting the assembled multi-component article, and a device for selectively removing the assembled optical fiber connectors from the nest which operates in response to the results of the inspection;

FIG. 10 is an enlarged partial fragmentary, cross-sectional, side elevational view taken along line 10—10 in FIG. 9C showing the inspection station in greater detail;

FIG. 11 is an enlarged, partial fragmentary, side elevational view of a properly assembled optical fiber connector retained in a nest which is inspected by the inspection station shown in FIG. 10 and showing two spaced apart inspection sites imposed thereon;

FIG. 12 is an enlarged, partial fragmentary, side elevational view of an improperly assembled optical fiber connector absent an elongated body;

FIG. 13 is an enlarged, partial fragmentary, side elevational view of an improperly assembled optical fiber connector absent a biasing means component;

FIG. 14 is an enlarged, partial fragmentary, side elevational view of an improperly assembled optical fiber connector absent a coupling nut;

FIG. 15 is an enlarged, partial fragmentary, side elevational view of an improperly assembled optical fiber connector absent a retaining component attached to the upper outside surface of the elongated body;

FIG. 18 is a cross-sectional, bottom plan view taken along line 18—18 in FIG. 17 showing vacuum channels formed in a vacuum plunger for placing a retaining ring on an optical fiber connector;

FIG. 20 is a partial fragmentary, top plan view of the retaining ring apply means as shown in FIG. 9C; and FIG. 21 is a partial fragmentary, cross-sectional view taken along line 21—21 in FIG. 20 showing the placement of a retaining ring feeder track, the delivery of retaining rings to a shuttle block and relative location of a retaining ring shim gate.

DETAILED DESCRIPTION OF THE PREFERRED EMBODIMENT

Figure 4:
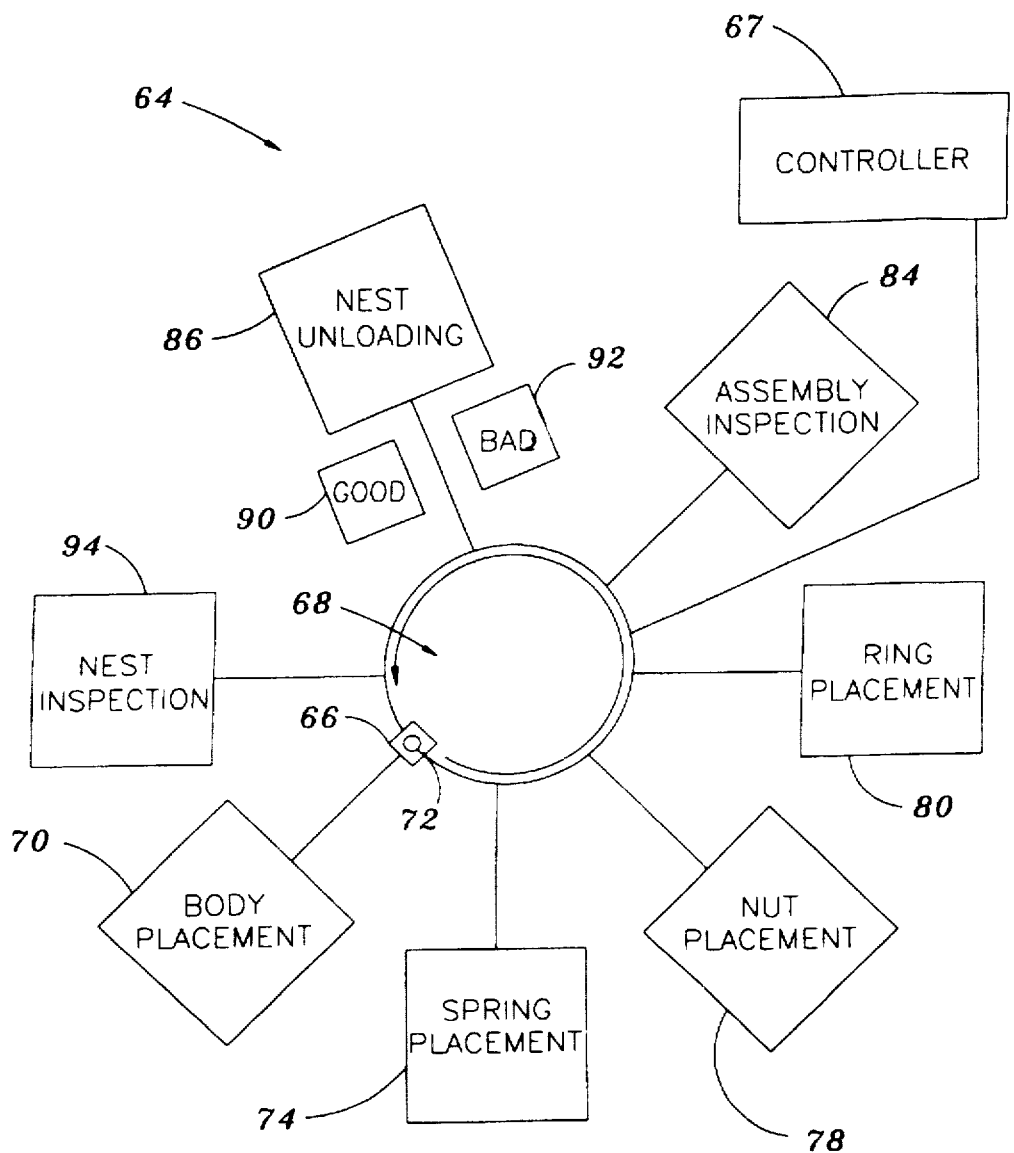
FIG. 4 is a diagrammatic representation of the process and apparatus of the present invention for assembling multiple component articles such as optical fiber connectors.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, a multiple component article 20 is shown in a perspective view. In particular, the multiple component article is an optical fiber connector 20. For purposes of description and explanation of the process and apparatus of the present invention, the optical fiber connector 20 is used as an example of a multiple component article. It should be noted that the present description is not intended to be limited to optical fiber connectors but should include other multiple component articles.

With reference to the exploded perspective view as shown in FIG. 2, the connector 20 includes a first generally elongated body 22, biasing means 24, a second body 26 shown herein as a coupling nut, and retaining means 28 shown herein as a continuous retaining ring. A longitudinal axis 30 is defined along the direction of elongation of the elongated body 22. Each of the components 22, 24, 26, and 28 are oriented and assembled along the longitudinal axis 30. Additionally, as it will be described in greater detail hereinbelow, the connector 20 is assembled with exposed areas which promote inspection of the assembled article using the inspection system of the present invention to determine whether or not the article is properly assembled.

With further reference to the optical fiber connector 20, the elongated body 22 includes a tubular portion 32 which is formed of a plastic material and which is overmolded on a ferrule 34. For purposes of this description, the tubular portion 32 and the ferrule will be referred to as the elongated body 22. The second body or coupling nut 26 is defined by a generally cylindrical wall 36 which, with further reference to FIG. 3, has transverse radially, inwardly projecting inner flanges 38 which define a bore 40. The tubular portion 32 extends through the bore 40 with the biasing means 24 retained between the flanges 38 and a shoulder 42 formed on the tubular portion 32. The coupling nut 26 and the biasing means 24 are retained in axial alignment with the tubular portion 32. The biasing means 24 is retained in a compressed state (see FIG. 3) between the inner flanges 38 of the coupling nut 26 and the shoulder 42. Compression of the biasing means 24 maintains a biasing force between the elongated body 22 and the nut 26 to provide a secure mechanical engagement of the connector 20 with a mating connector (not shown).

With reference to FIG. 3, it should be noted for purposes of clarification, that a first width dimension 44 is defined between outside surfaces 46 of the elongated body 22. A second width dimension 48 is defined between outside surfaces 50 of the coupling nut 26. The first width dimension 44 is generally measured at the shoulder 42 of the elongated body 22. The shoulder end of the elongated body is generally referred to as an optical fiber connecting end or the first free end 52 of the connector 20 while the opposite end of the elongated body 22 is referred to as the optical fiber entry end or second free end 54.

An external diameter 56 measured between outside surfaces of the body 58 proximate to the second free end 54 is slightly larger than an internal dimension 60 (see FIG. 2) measured between opposed edges 62 of the retaining means 28. As shown in the drawings, the retaining ring has opposed edges 62, 62 which define an aperture 63 in the retaining ring 28. The dimensional difference between the edges 62, 62 of the aperture 63 and the outside surface of the elongated body 22 create a friction fit between the retaining ring 28 and outside surface 58 of the elongated body 22. In fact, when the retaining ring 28 is attached to the elongated body 22, the inside edges 62 tend to scuff or skive the outside surface 58 which increases the frictional fit between the retaining ring 28 and the body 22.

Turning now to FIGS. 4–8, a process and apparatus 64 of the present invention is described. The apparatus 64 includes a fixture or nest 66 which is operatively associated with indexing means 68. The indexing means 68 is shown in FIGS. 9A–9C as a table or platform having a stationary portion 69 and a rotary dial 71 operatively attached thereto. The indexing means is of known construction to controllably index the nests 66 attached along the perimeter of the rotary dial 71. The elongated body 22 is positioned in the nest 66 for assembly of the connector 20. The indexing means 68 advances the nest 66 to a number of stations comprising the apparatus 64. The stations, described hereinbelow, are positioned in close proximity to one another in a circular arrangement for minimizing the travel distance, travel motion, and travel time of the nest between stations for increasing through put of the apparatus. The nest 66 retains the elongated body 22 in a selected orientation for assembly of the components 24,26,28 during the assembly process and for inspection after the connector 20 is assembled. Each of the stations is operatively interfaced with the indexing means 68 and a controller 67 to deliver a component to the elongated body positioned in the nest 66 and/or carry out an action on the connector 20.

The nest 66 is first indexed in position to receive an elongated body 22 from a body placement station 70. As shown in FIG. 5, the ferrule 34 is inserted into a correspondingly dimensioned bore 72 formed in the nest 66. The bore 72 is axially aligned for coaxially receiving the elongated body 22 along the longitudinal axis 30. Once the elongated body 22 is placed, the indexing means 68 indexes the nest 66 to a biasing means placement station or spring placement station 74. The biasing means 24 as shown in FIGS. 2, 3 and 5–8 is a coiled spring. As shown in FIG. 6, the coiled spring 24 defines a passage 76 which is coaxially aligned with the longitudinal axis 30 allowing the spring 24 to be positioned over the exposed free end 54 proximate to the outside surface 58 of the elongated body 22. The spring 24 is limited in its downward axial movement by the shoulder 42. After the spring 24 is positioned on the elongated body 22, the nest 66 is indexed to a nut placement station 78. As previously described, the coupling nut 26 includes a bore 40 which is coaxially aligned with the longitudinal axis 30 and positioned over the free end 54 of the elongated body 22 such that the flanges 38 abut the spring 24. This assembly state is shown in FIG. 7.

Once the coupling nut 26 is placed on the cumulative assembly, the nest 66 is indexed to a retaining means mounting station 80. With reference to FIG. 8, the retaining ring 28 is positioned with the aperture 63 coaxially aligned with the longitudinal axis 30. The ring 28 is downwardly displaced along the longitudinal axis 30. Application of the retaining ring 28 over the exposed free end 54 results in engagement between the inner edge 62 of the aperture 63 with the outside surface 58 of the elongated body 22. One of the objectives satisfied by the present invention is to position the coupling nut 26 and retain it by way of the retaining ring 28 such that the spring 24 is maintained in a compressed state between the coupling nut 26 and the shoulder 42. To this end, the coupling nut 26 can be displaced before the application of the retaining ring 28 so that the retaining ring 28 is axially driven to the prepositioned location of the coupling nut 26. The retaining ring 28 can also be driven in a manner such that the coupling nut 26 is simultaneously driven with the retaining ring 28 by forces (as indicated by reference arrows 82) acting on the retaining ring 28.

As will be described in greater detail hereinbelow, an inspection system is provided at an assembly inspection station 84 to determine whether the connector assembly 20 which is positioned proximate thereto is properly assembled. The nest unloading station 86 operates in response to the results of the inspection station 84 to determine whether the assembled article 20 is "good" or "bad", in other words, properly or improperly assembled, respectively. The nest unloading station 86 selectively moves properly connectors 20 to a "good" location 90 and improperly connectors 20 to a "bad" location 92.

After the nest 66 is unloaded by the nest unloading station 86, the nest 66 is then indexed by the indexing means 68 to a nest inspection station 94. The nest inspection station 94 is a precautionary measure to assure that the nest 66 is unloaded so that when the nest 66 is advanced to the body placement station 70, it is prepared to receive the next elongated body 22 for assembly. It should be noted that the indexing means 68 can operate with a nest 66 at each of the stations so that each station is performing an operation generally simultaneously.

FIGS. 9A, 9B and 9C are a grouping of drawings which are arranged as shown in FIG. 9, to illustrate the apparatus 64 in greater detail. For example, the body placement station 70 as shown in block diagrammatic form in FIG. 4 is illustrated with a vibratory bowl 96 and feeder track 98 of known construction. A placement device 100 of known construction, serves a properly oriented elongated body 22 to a correspondingly positioned nest 66. The bowl 96 and track 98 are of known construction such as is produced by Performance Feeders of Oldsmar, Fla. Numerous bodies 22 are retained in the bowl 96 and feed to the track 98 which includes a series of orienting structures to deliver each body in a selected orientation for receipt by the placement device and positioning in the nest 66.

Moving to the drawing sheet identified as FIG. 9B, the nest 66 advances to the spring placement station 74 which utilizes an air jet feeder 102 of known construction connected to a delivery tube 104. A delivery device 106 of known construction selectively drops or deposits an axially oriented spring 24 over the exposed end 54 of the elongated body 22. The air jet feeder 102 is of known construction such as the type produced by Becher Air Components of New Preston, Conn.

The nut placement station 78 includes a vibratory bowl feeder 108 and a correspondingly nut orienting track 110 of known construction such as produced by Performance Feeders of Oldsmar, Fla. A nut delivery device 112 of known construction receives a properly oriented coupling nut 26 from the track 110 and delivers the nut 26 over the exposed end 54 of the elongated body 22.

Progressing now to the drawing sheet identified as FIG. 9C, the nest 66 is indexed to the ring placement station 80. The ring placement station 80 includes a vibratory or gravity bowl feeder 114 which serves rings retaining 28 to an orienting track 116. The bowl feeder 114 and track 116 are of known construction such as produced by Performance Feeders of Oldsmar, Fla. The track 116 serves retaining rings 28 to a ring escapement assembly 118 which will be described in greater detail hereinbelow. The ring escapement assembly 118 delivers and applies a retaining ring over the exposed free end 54 of the elongated body 22. The ring escapement assembly 118 also drives the retaining rings 28 axially along the longitudinal axis 30 and simultaneously displaces the coupling nut 26 to a desired position along the longitudinal axis 30 thereby compressing the spring 24 between the shoulder 42 and the flanges 38.

Next, the nest 66 is advanced to the inspection station 84. The inspection station 84 is shown with greater detail in the partial fragmentary, cross-sectional side elevational view as shown in FIG. 10. The inspection station 84 includes a beam inspector assembly 119 having emitter means 120 and detector means 122. The emitter 120 is positioned on one side of the connector 20 travelling in the nest 66 and the detector 122 is positioned on the opposite side of the nest 66 facing the emitter 120. The beam inspector assembly 119 is generally of known construction such as is produced by Omron Corp. USA of Schaumburg, Ill. The assembly 119 includes a transmitter/receiver unit 124 which has a light source for transmitting light over a optical fiber cable 125 to the emitter/detector pair.

A first beam 126 is produced between a lower emitter and detector pair 120,122 and a second beam 127 is produced between an upper emitter and detector pair. The detector is similarly connected via an optical fiber cable 129 to carry the light sensed from the emitter to the transmitter/receiver unit 124. As shown in FIG. 10, a pair of beam inspector assemblies 119 are used to sense two separate sites relative to the connector 20.

An output signal from the assemblies 119 is communicated to the nest unloading station which selectively moves the properly or improperly assembled connectors to a corresponding "good" location 90 or a "bad" location 92. The nest is once again indexed to the nest inspection station 94 to verify whether the nest 66 has been emptied.

To further clarify the inspection system of the present invention, reference is made to FIGS. 10–15. The inspection system inspects for the proper or improper assembly of the connector 20. The inspection system operates using only two beams 126, 127 to test for at least five states of the connector 20 shown herein as the optical fiber connector. With reference to FIG. 10, the emitters 120 are positioned so that the first beam 126 will follow a path through a first detecting area 130 (see FIG. 11) and the second detector will produce the second beam 127 falling in a second detecting area 132 (see FIG. 15). As shown in FIG. 11, the first detecting area 130 is defined between a plane 134 generally parallel to the axis 30 and passing tangential to an outside surface 135 of the nut body 26 and a plane 136 passing along the outside surface 137 of the elongated body 22, a plane 138 bounded by an upper surface 139 of the nest 66, and a plane 140 defined by an opposing rim edge 142 of the nut 26. In a properly assembled connector 20, the first beam 126 will pass through the first detecting area 130 and fall upon the corresponding detector 122. The first detecting area 130, therefore, passes along an exposed portion 144 of the elongated body 22 and does not block by the coupling nut 26 or the nest 66.

With reference to FIG. 15, the second detecting site 132 is defined between the plane 134 along the outside surface 135 of the coupling nut 26, the plane 136 along the outside surface 137 of the elongated body 22, the plane 140 defined by the rim edge 142 of the coupling nut 26 and a plane 141 bounded generally by the upper surface of the shoulder 42. It is important that the beam path 127 be positioned near the edge of the plane 141 towards the nest 66 to detect the position of the coupling nut 26 in a properly assembled connector 20 (see FIG. 11).

We now turn to FIGS. 12–15 to show the alternate conditions of an improperly assembled article and how such an improperly assembled article is detected by the two beam inspection assemblies 119. In FIG. 12, the connector 20 is assembled without an elongated body 22. As such, the rim edge 142 of the coupling nut 26 rests against the upper surface 139 of the nest 66. In this condition, the first beam 126 passing through the first detecting site 130 is broken and not sensed by the corresponding detector. This condition indicates that the connector 20 is improperly assembled.

A similar condition is sensed in the improperly assembled connector 20 as shown in FIG. 13. In FIG. 13, the connector 20 has been assembled without a spring 24 and therefore the rim edge 142 of the nut is allowed to travel downwardly along the elongated body 22 and rest upon the upper surface 139 of the nest 66. Since the first beam 126 passing through the first detecting site 130 is broken, the inspection means 84 senses an improperly assembled connector 20.

FIGS. 13 and 15 show improperly assembled connectors 20 which result in the second beam 127 passing through the second detecting site 132. With reference to the discussion hereinabove, the inspection means 84 identifies a connector 20 as being properly assembled if the first beam 126 is allowed to pass through the first detecting site 130 and the second beam 127 is broken in the second detecting site 132. With this in mind, the connector 20 as shown in FIG. 14 is a improperly assembled without a nut 26 and as such, the second beam 127 is allowed to pass through the second detecting site 132 thereby indicating an improperly assembled connector 20. Similarly, the connector 20 as shown in FIG. 15 has been improperly assembled without a retaining ring 28 and therefor the spring 24 is not retained in compression between the nut 26 and the shoulder 42. In this condition, the nut 26 is displaced upwardly along the body 22 and therefore does not block the second beam 127 passing through the second detecting site 132. Since the second beam 127 passes through the second detecting site 132, the inspecting means 84 identifies this as improperly assembled connector.

With reference to FIGS. 9C and 16–21, the retaining means mounting station 80 is shown and includes the feeder 114 and track 116 which deliver retaining rings to a ring locating means 150 for attachment to a connector retained in a nest by ring applying means 152. In the interest of clarity, the feeder 114 and track 116 are only fully shown in FIG. 9C with fragmentary portions of the track illustrated in FIGS. 20 and 21. The ring locating means 150, shown in plan view in FIG. 9C and in the enlarged plan view of FIG. 20, operates to horizontally position a ring relative to a corresponding nest. Ring applying means 152, shown in a plan view in FIG. 9C and partial fragmentary, side-elevational views in FIGS. 16, 17 and 19 operates to capture a ring from the locating means 150 and vertically position and apply the ring on the connector retained in the nest. The ring applying means 152 includes driving means 154 shown herein as a vertically oriented ram of known construction.

Two vertically aligned, spaced-apart support structures 158 are attached to the stationary portion 69 of the indexing means 68. A cross member 160 extends between the vertical support members 158. A clearance space 162 is defined between a lower edge 164 of the cross member 160 and a top surface 166 of the dial 71. The dial 71 rotates through the space 162 to position a nest and a connector 20 positioned thereon relative to the ring applying means 152 for applying a retaining ring to the connector 20.

With reference to FIG. 9C, retaining rings are fed from the vibratory bowl 114 through the track 116 which arranges the retaining rings in a desired orientation through techniques and structures known in the art. As shown in FIG. 20, a gate assembly 168 is positioned between an end 170 of the track 116 and the locating means 150. The gate assembly 168 includes a shim gate 170 which reciprocates along a guide 171 in front of the track 116 by means of a dual acting cylinder 172. The gate assembly 168 controllably restricts the movement of retaining rings from the vibratory track 116 to the locating means 150. The locating means 150 includes a shuttle body 174 having a recess 176 formed therein which is sized and dimensioned for receiving a retaining ring.

With reference to FIG. 21, the track 116 is vibrated to promote the advancement of the retaining rings towards the shuttle 174. When the gate 170 is retracted by the dual acting cylinder 172, the first ring in the que in the track 116 will advance into the recess 176 for horizontal positioning relative to and for subsequent capture by the applying means 152. The cylinder 172 then cycles to return the gate to a position between the first ring, now located in the recess 176, and the second ring in the que so as to retain the rings in the que.

Having fed a ring to the shuttle 174, it can be seen in FIG. 20 that the shuttle 174 of the locating means 150 is operable to horizontally position (as indicated by arrow 177) the retaining ring relative to the nest 66. The shuttle 174 is moved (177) by a dual acting cylinder 180, this movement (177) is axially constrained by a guide bearing 178. The guide bearing 178 restricts the movement of the shuttle 174 along a central axis 182 so that precise repeatable locating can be achieved by the operation of the cylinder 180 for dependable placement of the retaining rings relative to the applying means 152.

Figure 16:
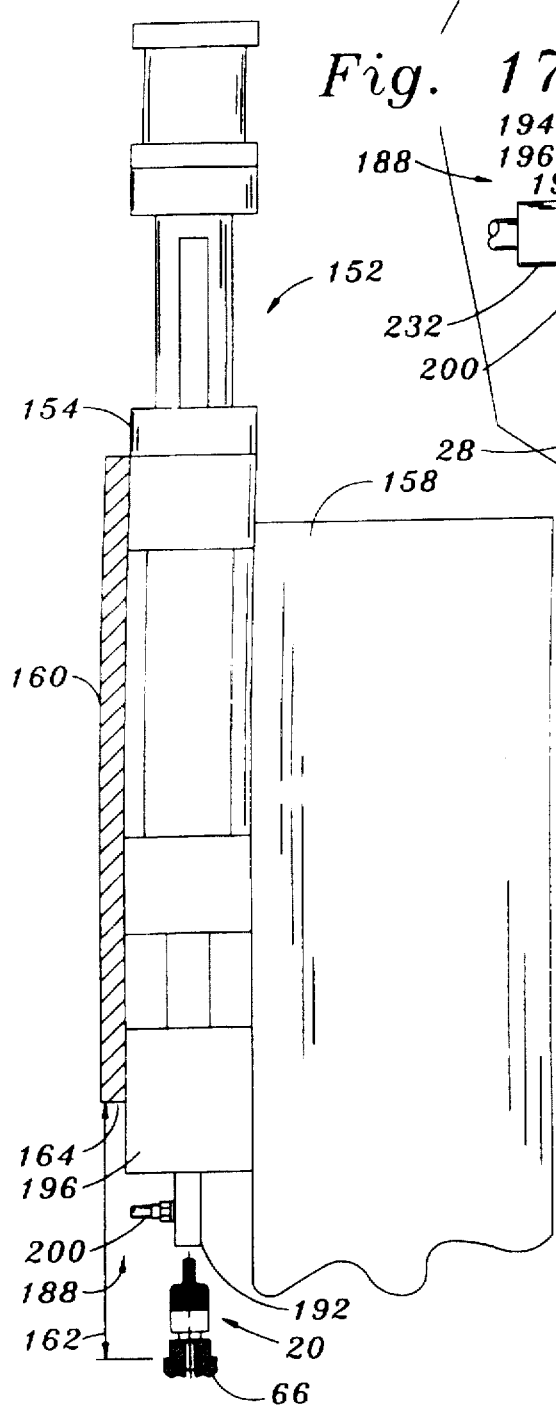
FIG. 16 is an enlarged, partial fragmentary, cross-sectional, side elevational view taken along line 16—16 in FIG. 9C showing a ram portion and a retaining component delivery portion associated therewith for applying a retaining ring to the optical fiber connector.
Figure 17:
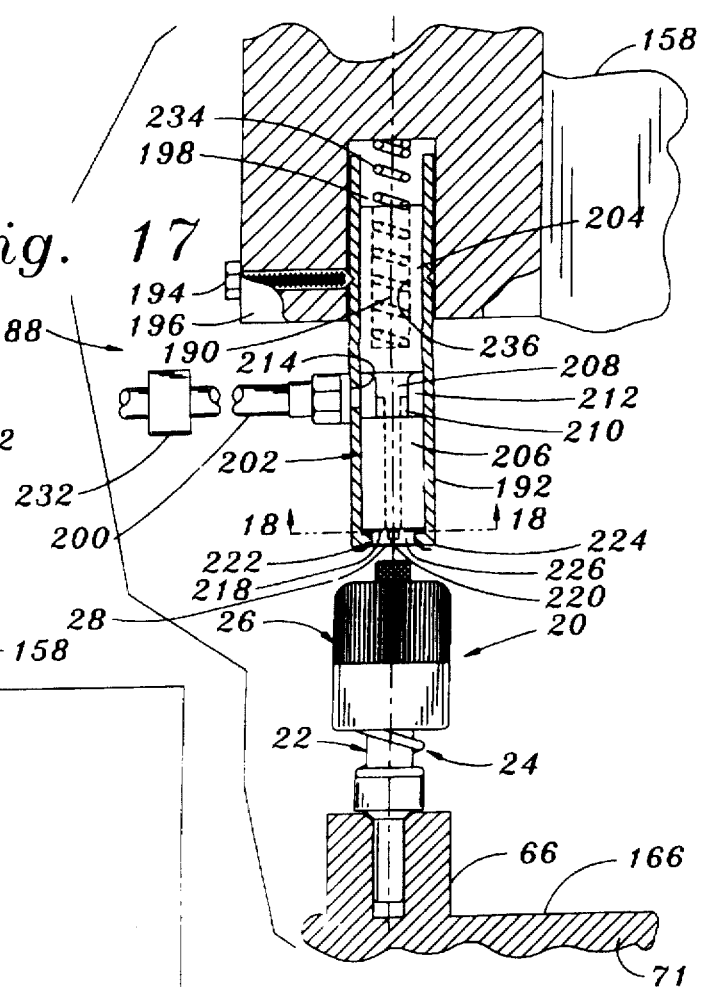
FIG. 17 is an enlarged, partial fragmentary, cross-sectional, showing the retaining component delivery portion for delivering and applying a retaining ring to the outside surface of an elongated body of the optical fiber connector.
Figure 19:
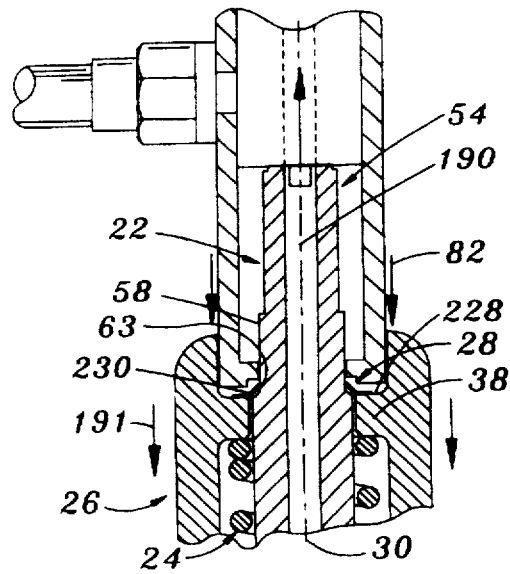
FIG. 19 is an enlarged, cross-sectional view of the tip of the retaining component delivery portion showing a retaining ring retained thereon.

As shown in FIG. 21, an annular vacuum orifice 184 communicating with the recess 176 allows a vacuum line 186 to draw a vacuum on the recess 176 and thereby retain the ring on the shuttle 174. (The vacuum line 186 is not shown in FIG. 20 in the interest of clarity.) This vacuum orifice 184 prevents the ring positioned on the shuttle 174 from becoming displaced in the recess 176. The shuttle 174 is advanced to a position underneath the applying means 152 whereupon a ring applying head 188 produces forces which lift the ring from the shuttle and retain the ring on the head 188 for vertical placement onto a connector 20. With reference to FIGS. 16, 17 and 19 the head 188 retains a ring for placement over the free end 54 of a connector 20 retained in a nest 66 therebelow. The drive means 154 vertically downwardly displaces the head 188 during the applying process (see FIG. 19).

A preferred embodiment of the applying head 188 creates a vacuum force to lift the ring off of the shuttle 174 which is precisely positioned immediately below the head 188. Further details with regard to the vacuum operated embodiment as shown herein will be provided hereinbelow. In an alternate embodiment, a magnetic head may be used to capture the ring from the shuttle and retain the ring for vertical displacement onto a connector. As shown in FIGS. 17 and 19, in either embodiment, the ring is retained on the head 188 and applied by the applying means 152 onto the connector 20. The head 188 is axially advanced along a central axis 190 generally coaxial with the axis 30 of the connector 20. The ring is downwardly displaced over the free end 54 of the elongated body 22.

As shown in FIG. 19, the aperture 63 of the retaining ring 28 is positioned over the free end 54 of the elongated body. The retaining ring 28 is moved downwardly along the outside surface 58 of the elongated body 22. As the head 188 is downwardly advanced (as indicated by arrows 82) toward the coupling nut 26, the ring 28 abuts the inner flanges 38. Further driving of the head along the central axis 190 drives (as indicated by arrows 191) the coupler nut 26 downwardly thereby compressing the spring 24. The head is retracted after applying the retaining ring 28 to the body 22, with the frictional forces between the inner rim of the aperture 63 and the outside surface 58 of the body 22 dislodging the ring from the head 188.

As disclosed hereinabove, the preferred embodiment of the head 188 employs vacuum forces to pick up the ring from the shuttle. The vacuum operated head 188 is shown in greater detail in FIGS. 17-19. With reference to FIG. 17, the vacuum head 188 includes a sleeve 192 which is retained by a set screw 194 on a head body 196. The sleeve 192 has a hollow cavity 198 which communicates with a vacuum line 200. An axially displaceable vacuum plunger 202 is positioned in the cavity 198 within the sleeve. The vacuum plunger 202 includes a trailing portion 204, a leading portion 206 and a tapered portion 208 positioned between the leading and trailing portions 206,204. Channels 210 are formed through the tapered portion 208 and the leading portion 206 generally parallel to the central axis 190. The channels 210 communicate with an annular gap 212 formed between the tapered portion 208 and an inside surface 214 of the sleeve 192. The channels 210 run towards the leading portion 206 and communicate with a recess 216 formed in a face 218 of the leading portion 206. A protruding tip 220 extends from the recess and projects into a correspondingly positioned aperture 222 formed in the protruding end 224 of the sleeve 192.

The aperture 222 and the tip 220 are sized and dimensioned such that a gap 226 is formed between the outside surface of the tip 220 and the inside surface of the aperture 222. This gap 226 communicates with the recess 216 and channels 210 to induce a vacuum therethrough. An annular counterbore 228 is formed in the protruding end 224 of the sleeve 192. When the vacuum is activated, a ring positioned thereunder on the shuttle 174 is lifted from the shuttle onto the sleeve 192. When positioned against the protruding end 224, an extending portion 230 of the ring is received in the counterbore 228 with the tip 220 positioned for protruding through the aperture 63 in the ring. The portion of the ring surrounding the aperture 63 is drawn against the sleeve under the influence of the vacuum.

A vacuum sensor 232 on the vacuum line 200 senses whether or not the vacuum has changed. Since the vacuum force is a generally consistent force, the force will change as a result of a ring being positioned against the sleeve 92. If the vacuum sensor 232 does not sense a change in the vacuum force, a condition indicating that a ring has not been picked up will be produced. When the sensor 232 senses that a ring has not been picked up, the apparatus can position the head 188 to make a second attempt to pick up a ring or can provide an indication to the operator that this failure condition exists. In either event, the sensor 232 provides feedback as to the success of each ring pick up operation.

In use, the retaining means mounting station 80 positions rings relative to the connector positioned on a nest as each nest is indexed relative to the ring applying means 152. A plurality of rings are fed from the feeder to the track 116 under vibratory action whereupon they are sequentially positioned on a shuttle 174 of the ring locating means 150. The gate assembly 168 is employed to meter individual rings from the track 116 to the recess 176 in the shuttle 174. The gate assembly 168 constrains a que of rings and controllably releases a single ring into an empty recess 176.

The shuttle 174 is reciprocated (177) relative to the applying means 152 to precisely and repeatably position a ring beneath the ring applying head 188. In the preferred embodiment as illustrated herein, the shuttle includes a vacuum which is activated when a ring is positioned in the recess 176. The vacuum is drawn through the annular orifice 184 to retain the ring in the recess 176 on the shuttle 174. Once the shuttle positions the ring underneath the applying head, the vacuum drawn through the annular orifice 184 and the vacuum drawn through the applying head 188 are synchronously deactivated and activated, respectively. Deactivating the shuttle vacuum allows the activated applying head vacuum to precisely lift the ring off of the shuttle and onto the end 224 of the sleeve 192. The shuttle 174 is retracted and a nest is advanced into position underneath the applying head 188.

The applying head is driven downwardly (82) to position the ring over the free end 54 of the elongated body 22. When the head is driven downwardly, the aperture 222 passes over and along the outside of the elongated body 22. During the displacement of the head 188 along the axis 190, a spring 234 retained in a bore 236 of the plunger 202 is compressed by the axial displacement of the plunger 202 within the cavity 198. When the ring is properly positioned along the elongated body 22, the head is retracted upwardly along the axis 190 thereby removing the elongated body 22 from the aperture 222. The upward displacement of the head results in the plunger 202 moving downwardly through the cavity 198 under the influence of the compressed spring 234. The spring forces position the plunger 202 such that the tip 220 once again is positioned within the aperture 222. The tip 220 is positioned against the free end 54 of the elongated body 22 until the body 22 clears the aperture 222 to prevent the body 22 from being caught in the sleeve and lifted from the nest. The completed connector retained in the nest is advanced out of position relative to the retaining means mounting station 80 and is advanced to the assembly inspection station 84 for operations as discussed hereinabove.

The nest 66 is indexed into position for inspection at the inspection station 84 in accordance with the description provided hereinabove. After inspection, the nest and the assembled connector are advanced to the nest unloading station in accordance with the description provided hereinabove. Finally, the nest is indexed to the nest inspection station 94 as shown in FIG. 9. The nest inspection station operates in essentially the same manner as the assembly inspection station 84 except that only one beam is produced across the nest. The beam is positioned to pass above the nest in alignment with the bore 72. If the nest is empty, the beam path is connected and an empty nest signal is transmitted to the controller. If a component such as the elongated body 22, biasing means 24, coupling nut 26, or retaining ring 28 are positioned on the nest, the beam path is disrupted by the component thereby indicating that the nest is not empty. A loaded nest signal is transmitted to the controller which alerts an operator by means of a visual or auditory signal. The operator can then remove the component from the loaded nest on the fly or, preferably, stopping the process using any one of several stop buttons 238 positioned around the indexing table. The loaded nest is then cleared and the operator reinitiates the assembly process by operating appropriate controls on the controller.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. An apparatus for assembling an optical fiber connector, said optical fiber connector including an elongated body having a longitudinal axis and opposed free ends, a coupling nut operatively associated with said elongated body, biasing means positioned between said elongated body and said coupling nut, and retaining means being attachable to said elongated body abutting said coupling nut for retaining said biasing means in compression between said coupling nut and said elongated body, said apparatus comprising:

a fixture for positioning said elongated body in a selected orientation with one free end of said elongated body being exposed;

means for placing said elongated body in retaining engagement with said fixture in a selected orientation;

means for placing said biasing means on said elongated body over said exposed free end;

means for placing said coupling nut in a selected orientation on said elongated body over said exposed free end, said coupling nut positioned on said elongated body abutting said biasing means; and means for mounting said retaining means on an outside surface of said elongated body, said means for mounting said retaining means on said elongated body locating said retaining means on said elongated body in a position for compressing said biasing means between said coupling nut and said elongated body.

2. The apparatus for assembling an optical fiber connector as recited in claim 1, further comprising means for orientating said retaining means in a selected orientation for proper placement on and engagement with said elongated body.

3. The apparatus for assembling an optical fiber connector as recited in claim 1, further comprising means for inspecting assembled ones of said optical fiber connector for determining whether said optical fiber connector is properly assembled.

4. The apparatus for assembling an optical fiber connector as recited in claim 3, further comprising means for selectively moving optical fiber connectors to selected locations coupled to said inspecting means, said moving means being responsive to said inspecting means such that properly assembled optical fiber connectors are moved to a first location and improperly assembled optical fiber connectors are moved to a second location.

5. The An apparatus for assembling an optical fiber connector as recited in claim 3, said inspecting means further comprising:

emitter means for identifying the presence of said components of said optical fiber connector and for indicating when said components are properly assembled, said emitter means being positioned for acting on at least two sites relative to said optical fiber connector positioned in said fixture; and detector means coupled with said detector means for sensing whether said emitter means contacts said optical fiber connector at said at least two sites.

6. The apparatus for assembling an optical fiber connector as recited in claim 1, said means for mounting said retaining means further comprising:

means for locating said retaining means relative to said free end of said elongated body;

vacuum means for placing said retaining means being positionable relative to said locating means for moving said retaining means from said locating means under the influence of vacuum forces; and means for driving operatively associated with said vacuum means for controllably driving said retaining means into engagement with an outside surface of said elongated body for retaining said coupling nut and said spring in compression on said elongated body.

7. The apparatus for assembling an optical fiber connector is recited in claim 6, wherein said means for locating produces a vacuum force for holding said retaining means thereon while locating said retaining means relative to said vacuum means.

8. The apparatus for assembling an optical fiber connector as recited in claim 7, further comprising a vacuum sensor coupled to said vacuum means for sensing whether said vacuum means moves said retaining means from said locating means.

9. The apparatus for assembling an optical fiber connector as recited in claim 1, wherein said retaining means is magnetically responsive, and said means for mounting said retaining means comprising:

means for locating said retaining means relative to said free end of said elongated body;

magnetic means for placing said retaining means being positionable relative to said locating means for magnetically moving said retaining means from said locating means; and means for driving operatively associated with said magnetic means for controllably driving said retaining means into engagement with an outside surface of said elongated body for retaining said coupling nut and said spring in compression on said elongated body.

10. The apparatus for assembling an optical fiber connector as recited in claim 1, further comprising means for indexing said fixture from said means for placing said biasing means on said elongated body, to said means for placing said coupling nut on said elongated body abutting said biasing means, to said means for mounting said retaining means on an outside surface of said elongated body.

11. The apparatus for assembling an optical fiber connector as recited in claim 1, wherein said means for placing said biasing means on said elongated body, said means for placing said coupling nut on said elongated body, and said means for mounting said retaining means define assembly stations, each of said assembly stations having at least one operation interface for executing associated operations on said elongated body retained in said fixture, each of said operation interfaces of each of said assembly stations being placed in close proximity for minimizing the travel distance, travel motion, and travel time of said fixture between said stations for increasing the throughput of said machine for assembling an optical fiber connector.

* * * * *